(12) United States Patent
Lange et al.

(10) Patent No.: US 7,142,315 B1
(45) Date of Patent: Nov. 28, 2006

(54) SLIT CONFOCAL AUTOFOCUS SYSTEM (75) Inventors: Steve R. Lange, Alamo, CA (US); Charles E. Wayman, San Jose, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 455 days.

(21) Appl. No.: 10/793,026

(22) Filed: Mar. 3, 2004

Related U.S. Application Data (60) Provisional application No. 60/537,265, filed on Jan. 16, 2004.

(51) Int. Cl.
*G01B 11/06* (2006.01)
*G02B 27/40* (2006.01)

(52) U.S. Cl. ............... 356/632; 356/609; 356/624; 250/201.4

(58) Field of Classification Search ........... 356/609, 356/624, 630, 631, 632; 250/201.2, 201.3, 250/201.4
See application file for complete search history.

(56) References Cited

U.S. PATENT DOCUMENTS

| 5,248,876 A | 9/1993 | Kerstens et al. |
| 6,838,650 B1 * | 1/2005 | Toh ............ 250/201.3 |

\* cited by examiner

*Primary Examiner*—F. L. Evans
(74) *Attorney, Agent, or Firm*—Beyer Weaver & Thomas LLP (57) ABSTRACT

A technique for focusing and maintaining the focus of an inspection or review system upon a specific layer of a multi-layered specimen is described. In one embodiment, a confocal autofocus system can be used to focus an optical inspection or review system upon the top layer of a semiconductor wafer thin-film stack. The confocal autofocus system utilizes a tilted mask having a linear array of apertures or a continuous slit that is aligned so that a respective linear array of focal points or a focal slit is parallel with a scanning axis of the inspection system. Appropriate processing of the profile depth information yields knowledge of the depth of various layers in the specimen and allows for selection of the layer or location of interest upon which to focus the inspection or review system.

18 Claims, 5 Drawing Sheets

Confocal Autofocus System

FIG. 1
Confocal Autofocus System

| Layer | Depth (um) |
|---|---|
| Layer 136 | 0.0 |
| Layer 134 | 0.5 |
| Layer 132 | 0.75 |
| Layer 130 | 1.5 |
| Layer 138 | 2.0 |

| Layer | Depth (um) |
|---|---|
| 1st Signal (134) | 0.0 |
| 2nd Signal (132) | 0.25 |
| 3rd Signal (130) | 1.0 |
| 4th Signal (138) | 1.5 |

FIG. 6A Reference Depth Map in Chart Form

FIG. 6B Auto-Focus Depth Map in Chart Form

SLIT CONFOCAL AUTOFOCUS SYSTEM

This application claims priority of U.S. provisional patent application No. 60/537,265, filed Jan. 16, 2004, entitled "Slit Confocal Autofocus System," which is hereby incorporated by reference in its entirety for all purposes.

FIELD OF THE INVENTION

The present invention relates generally to wafer inspection systems, and more specifically to techniques for focusing on a wafer surface for wafer inspection and review systems.

BACKGROUND OF THE INVENTION

The semiconductor manufacturing industry is based upon very precise manufacturing processes as the scale of semiconductor devices continues to shrink. For example, integrated devices, vias, and other electrical pathways are being formed at smaller dimensions in accordance with performance and size constraints. Highly precise inspection systems are used to control the quality of today's semiconductor manufacturing systems. For example, the ability of inspection systems to detect defects on a specimen during a manufacturing process allows process engineers to fine tune a manufacturing system for greater yield and shorten the time needed to being a new facility or piece of processing equipment up to full production capacity.

Typically, an inspection system is interested in detecting defects that occur during the most recently formed layer or process of a semiconductor wafer. This is usually the topmost layer of the thin-film stack. Most of the current inspection systems use autofocusing techniques that track a signal from the brightest layer within a semiconductor wafer thin-film stack. Unfortunately, the top layer of inspected thin-film stacks can be transmissive and reflects little light, while underlying layers (such as Copper, Silicon, Aluminum, and Tungsten layers) reflect a significantly higher percentage of light giving the autofocus system the highest signal to operate on. This causes all inspection systems to determine best focus at the underlying layers while the top-most layer, which is the layer of interest for defect inspection systems, is left out of focus; unless a focus offset is applied. Even with an offset, all inspection systems will track the signal from the brightest layers as it varies up and down within a thin-film stack as the inspection system is scanned across a wafer. Thus, the top surface of a wafer may be out of focus by varying degrees while an inspection system scans across a wafer. Errors in proper focus position can be on the order of several microns in some cases, which is much larger than the depth of focus of many advanced wafer inspection and review tools.

Focus errors affect image contrast levels such that signals from defects will be weakened. This lowers the sensitivity of many inspection systems today. Furthermore, as the operational wavelengths of inspection tools shortened, the depth of focus of such inspection stools also shrink. This only exacerbates the problem of receiving weak signals from defects due to inspection systems that are not properly focused upon the top-most layer of wafer thin-film stacks. Therefore, out-of-focus inspection systems will have even worse sensitivity due to the smaller wavelengths, which were used initially to obtain higher resolution and sensitivity.

Some autofocus techniques utilize confocal autofocus techniques that allow inspection systems to attempt to locate and focus upon the top-most layer of thin-film stacks. In confocal optical systems, the image of a pinhole light source is focused by the optical system onto a point in the specimen and that point is again focused by the optical system onto a conjugate pinhole aperture with a detector located behind this pinhole to detect the signal. Confocal imaging systems provide signals that are sharply peaked about the conjugate focal points of pinholes in a spatially-coherent imaging system. This allows confocal imaging systems to accurately identify the depth of various surfaces within a thin-film stack by recording when they have high signals indicating a reflective surface at that focus location. In contrast, brightfield inspection systems uniformly illuminate a specimen and do not have apertures at the detector. Therefore, depth-signal curves for brightfield systems are flat and signal peaks for each layer of a thin-film stack are not identifiable. However, one issue with confocal imaging is that it provides a signal only where the conjugate images are sampling the depth. Unfortunately, signal intensity drops off quickly at points above and below the focal points because of the limited light collection at the detector for out-of-focus locations. Thus, they only provide limited depth and spatial information unless scanned in some manner.

Some attempts to mitigate this issue in order to inspect a larger area of a specimen involve modulating or scanning an aperture's focus location along the depth a thin-film stack. These techniques involve adjusting the height of an aperture formed in a mask, which is placed in front of an illumination source, while the inspection system is scanned across the surface of a specimen. However, this proved impractical as the layers within the thin-film stack are only partially sampled because the height of the focus location cannot be scanned throughout the entire depth of a thin-film stack at a particular location before the field of view of the inspection system moves past that particular location. Also, the confocal scanning data is blurred due to the motion of the stage for the inspection or review system. Furthermore, a signal for a layer might disappear completely if that layer is etched away in certain locations, or due to thin-film interference that just happens to return a destructive interference condition yielding no reflected signal. Unfortunately as a result, these concepts provide only partial (or sampled) depth information regarding the layers of a thin-film stack. Therefore, these techniques are unreliable for locating and focusing upon a top surface of a thin-film stack.

In view of the foregoing, there are continuing efforts to provide an improved autofocus subsystem that locates a specific layer or offset to a particular layer of interest, such as a top-most layer, within a semiconductor wafer or lithography-reticle surface inspection or review system would be desirable.

BRIEF SUMMARY OF THE INVENTION

The present invention pertains to a technique for focusing and maintaining the focus of an inspection system upon a specific layer of a multi-layered specimen. In one embodiment, a confocal autofocus system can be used to focus an optical inspection system upon the top layer of a semiconductor wafer thin-film stack. The confocal autofocus system utilizes a tilted mask having a linear array of apertures or a continuous slit that is aligned so that a respective linear array of focal points or a focal slit is parallel with a scanning axis of the inspection system. This arrangement allows the autofocus system to obtain information regarding the height of each layer throughout the entire thickness of a thin-film stack specimen while the specimen is scanned past the autofocus system.

As a method, one embodiment of the present invention includes at least determining the depth of all layers within a multilayered thin-film stack, determining the depth of a top layer within the multilayered thin-film stack at a desired location upon the thin-film stack, and focusing the optical inspection system upon the top layer, or at a specified offset to the top layer. In one embodiment, the operation of determining the depth of each layer at the desired location involves, scanning an autofocus system across the desired location of the thin-film stack, recording signals received from all of the layers of the thin-film stack, determining the average height of each and every layer of the thin-film stack and the height difference between each of the layers of the thin-film stack from the recorded signals, and generating a reference depth map that indicates the relative depths of the layers within the thin-film stack. In another embodiment, the operation of determining the depth of the top layer involves recording a signal from a top layer of the thin-film stack, determining the height of the top layer at the desired location, recording a signal from at least one other layer at a location proximate to the desired location, determining the height of the at least one other layer relative to the height of the top layer, generating an autofocus depth map that indicates the relative depths of the top layer and the at least one other layer, correlating the autofocus depth map to the reference depth map so that each of the layers of the autofocus depth map match up to respective layers of the reference depth map, and determining the depth of the top layer to be equal to the depth of the layer in the reference depth map that correlates to the top layer in the autofocus depth map.

As an apparatus, one embodiment of the present invention pertains to a confocal autofocus system that includes at least an autofocus illumination source that generates a illumination beam, and an illumination mask positioned in front of the illumination source wherein the tilted (relative to the perpendicular of the optical axis) illumination mask has a single linear array of apertures or a continuous slit, wherein the illumination energy beam passes through the illumination mask and forms a corresponding tilted linear array of focal points or a focal slit within a specimen that is parallel to a scanning direction of the autofocus system, whereby depth data for the entire height dimension of an area of interest within a thin-film stack can be determined.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention pertains to a technique for focusing and maintaining the focus of an inspection system upon a specific layer of a multi-layered specimen. In one embodiment, a confocal autofocus system can be used to focus an optical inspection or review system upon the top layer of a semiconductor wafer thin-film stack or a reticle mask for lithography. The confocal autofocus system utilizes a tilted mask in the illuminator having a linear array of apertures or a continuous slit that is aligned so that a conjugate image of a respective linear array of focal points or a focal slit is parallel with a scanning axis of the inspection system. This arrangement allows the autofocus system to obtain information regarding the height of each layer throughout the entire thickness of a thin-film stack. The confocal autofocus system can then be used to maintain the focus of the inspection system upon whichever layer is the uppermost exposed layer along the scanning axis of the inspection system. The confocal autofocus system of the present invention provides reliable signals from each of the layers within the specimen, thereby increasing the sensitivity and repeatability of the autofocus system without paying a very high cost for obtaining higher resolution.

The following description will explain both the configuration of the confocal autofocus system and an autofocus algorithm for processing data. The description of the invention begins with FIG. 1, which illustrates a diagrammatic view of one embodiment of a confocal autofocus system of the present invention 100. Confocal autofocus system 100 includes an illumination source 102, an illumination beam 103 generated by illumination source 102, one or more beam-forming optical lenses 104, an illumination mask 106, a beam splitter 108, an objective lens set 110, and detector 112. Autofocus system 100 is set up to focus an inspection system (not shown) upon specimen 114, which can be any multi-layered specimen such as a semiconductor wafer. Specimen 114 is supported by a support stage 116.

Figure 1:
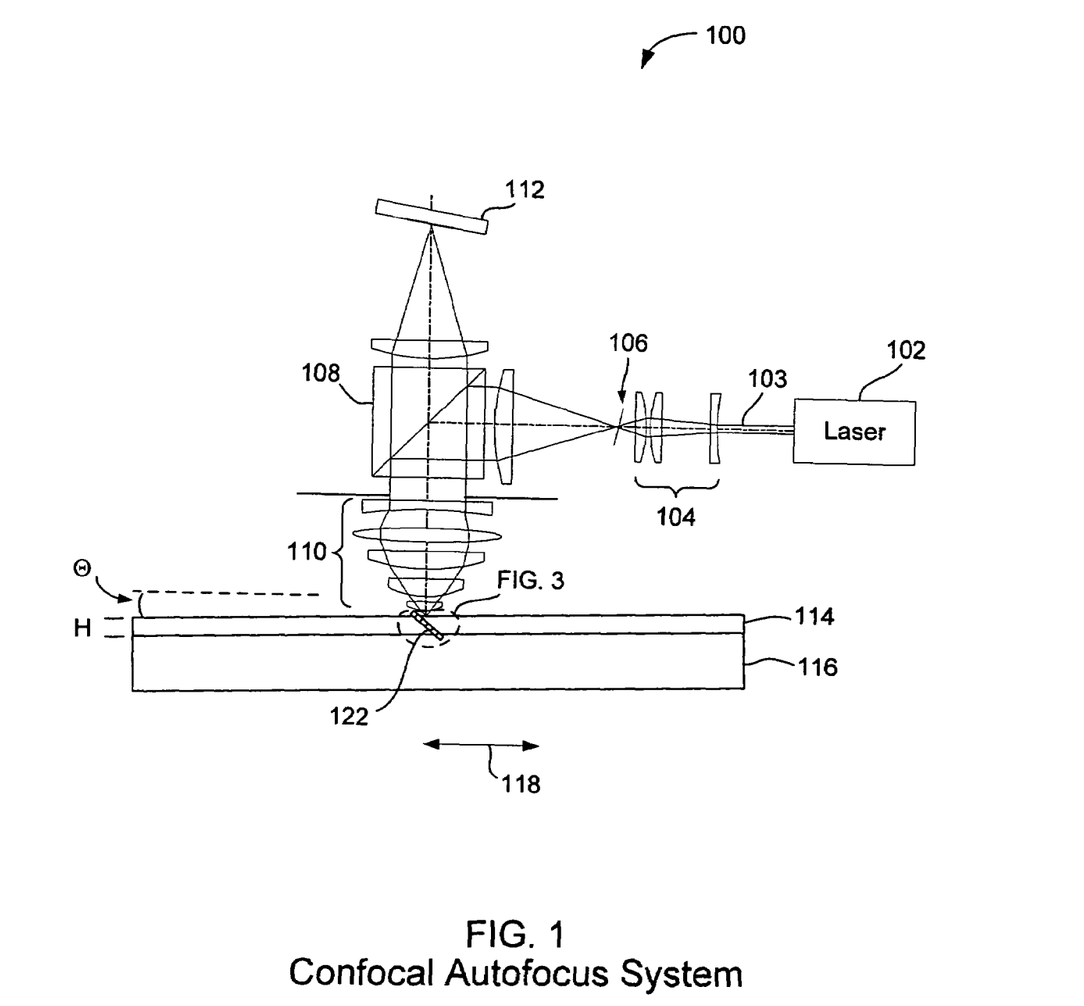
FIG. 1 illustrates a diagrammatic view of one embodiment of a confocal autofocus system of the present invention.

Generally, autofocus system 100 operates by directing illumination beam 103 onto specimen 114. Illumination beam 103 is directed through beam-forming optical lenses 104, is reflected by beam splitter 108, and then through objective lens 110. Objective lens 110 focuses illumination beam 103 at focal points that span the entire height, H, of the depth of interest of specimen 114. The focal points can also be referred to as a confocal sensing location. As will be described later, the confocal sensing location can be a continuous area within which signals can be collected from specimen 114 or it can be a plurality of individual areas within which signals can be collected. The reflections of illumination beam 103 off of specimen 114 are signals that are passed back through objective lens 110 and beam splitter 108 and then are detected by detector 112. A computer-processing unit (not shown) is then used to determine the height of the layer of interest within specimen 114.

Illumination source 102 generates illumination beam 103 that is used to illuminate specimen 114. Illumination source 102 can be a variety of light source types such as a laser, arc lamp, filament lamp, flash lamp, or plasma. In FIG. 1, illumination source 102 is a laser. The wavelength of illumination source 102 can be within or outside of the operational wavelength band of the optical inspection system that is to be focused by autofocus system 100. Illumination source 102 can be a separate illumination source or the same illumination source as the source used for the optical inspection system.

Beam-forming optical lenses 104 can be one or more optical lenses used to focus illumination beam 103 onto the one or more apertures formed on illumination mask 106. The prescription for each of the lenses can be determined by one of ordinary skill in the art depending upon specific autofocus system parameters and constraints.

Illumination mask 106 is a light-blocking mask with one or more apertures to allow a portion of illumination beam 103 to pass through. Illumination mask 106 is tilted with respect to the optical axis of the optical system. The one or more apertures are arranged in illumination mask 106 so that a linear array of focal points will align in parallel with a scanning direction 118 of the optical inspection system. The tilt of illumination mask 106 causes the conjugate focal points to form throughout the height, H, of specimen 114. Apertures within illumination mask 106 can be multiple pinhole apertures in a linear formation or a single lengthwise slit. When multiple apertures are utilized, the separation of the apertures should be greater than four point-spread functions apart to avoid crosstalk between apertures.

The following description will describe the focal points formed by illumination mask generally as a confocal sensing location 122 whereby it should be understood that confocal sensing location 122 refers to a single focal slit, single focal point, or multiple focal points or slits. Again, a slit within illumination mask 106 causes a conjugate focal slit to be formed within specimen 114. Confocal sensing location 122 represents the locations at which autofocus system 100 focuses upon. Confocal sensing location 122 typically will cover a linear area that will be parallel with scanning axis 118 of the optical inspection system. Confocal sensing location 122 allows autofocus system 100 to focus upon specimen 114 along the entire height, H, of the area of interest within specimen 114. In this way, confocal autofocus system 100 is able to obtain sharp signals indicating the height of each layer within specimen 114.

Objective lens 110 focuses illumination beam 103 onto specimen 114 such that confocal sensing location 122 is formed within specimen 114. Objective lens 110 also focuses light reflected off of specimen 114 onto detector 112. As is commonly understood, beam-splitter 108 directs illumination beam 103 from illumination source 102 towards objective lens 110 and allows the reflected signals from specimen 114 to pass through to detector 112.

Detector 112 detects the reflected signals from specimen 114 and is positioned at the conjugate focal location of confocal autofocus system 100. Detector 112 senses the confocal signal at each focus location within confocal sensing location 122 within specimen 114. Detector 112 is also tilted to focus in a conjugate manner to detect the signal from each focus location within confocal sensing location 122. As specimen 114 is scanned past autofocus system 100, the signal that detector 112 array receives is an integration of the confocal response from specimen 112. The confocal arrangement requires a second pinhole or slit at a conjugate location to the focus positions in sample 122 and can be obtained either by using a separate mask of appropriate size and location or using the detectors themselves if they are sized appropriately to the focused spot size. The sizing of the conjugate pinholes and/or detector elements is well known to those familiar with the art.

Detector 112 can be charge-coupled device (CCD) detectors, photodiode arrays, or sets of single photodiodes or avalanche photodiodes for each pinhole conjugate location. Detector 112 conforms in shape and functionality to detect signals in the configuration that matches the focal points formed in specimen 114. That is, a continuous linear detector 112 is used to detect signals from specimen 114 when a focal slit is formed. Or, a linear array of point detectors 112 is used when a linear array of focal points is formed within specimen 114.

In alternative embodiments, a two-dimensional detector array can be utilized when a detector mask is placed before the detector. In these embodiments, the detector mask is formed with apertures that match the apertures formed in illumination mask 106.

Support stage 116 is a mechanical stage that support specimen 114. Support stage 116 can move up and down in the vertical direction in order to position specimen 116 at the proper focal distance from an inspection system. The height of support stage 116 is adjusted according to autofocus system 100 and the autofocus algorithm of the present invention.

Figure 2:
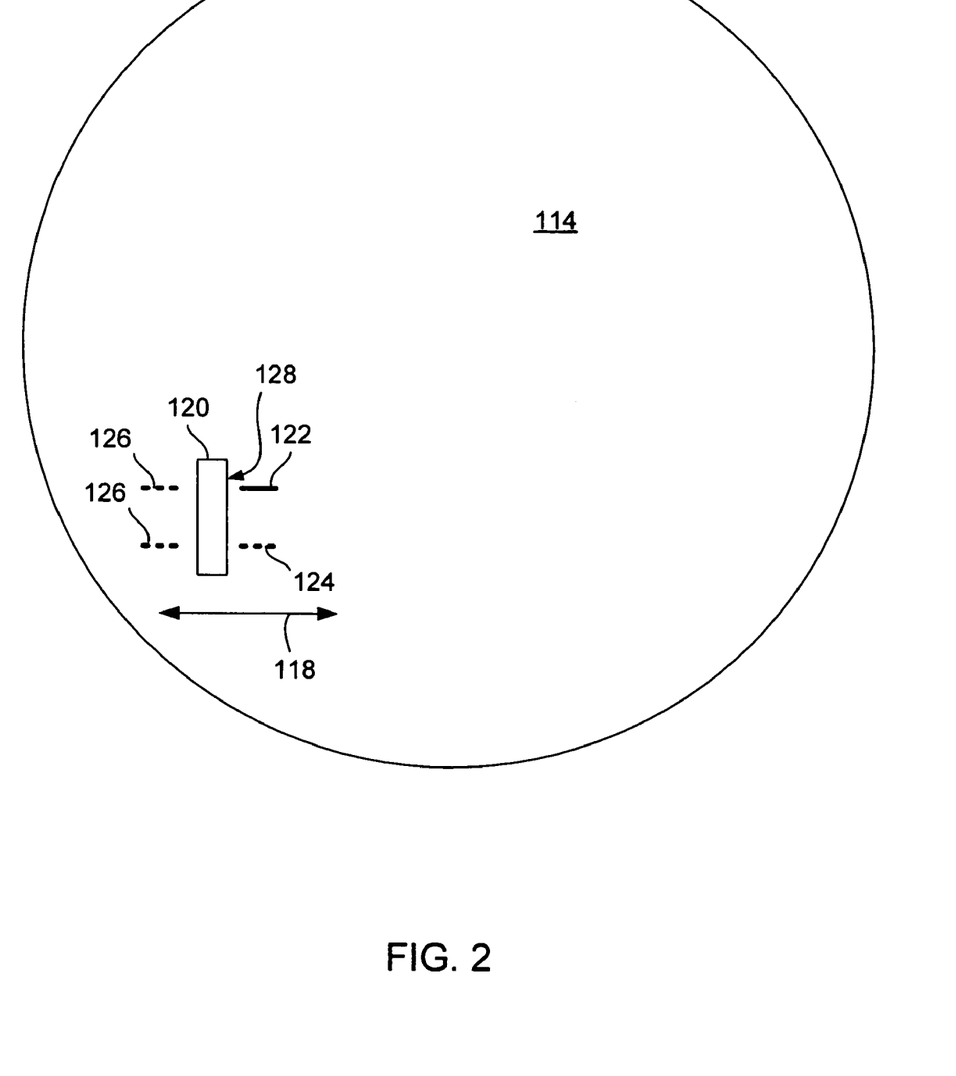
FIG. 2 illustrates a top plan diagrammatic view of an inspection field of view and a confocal sensing location that are scanned across a specimen.
Figure 3:
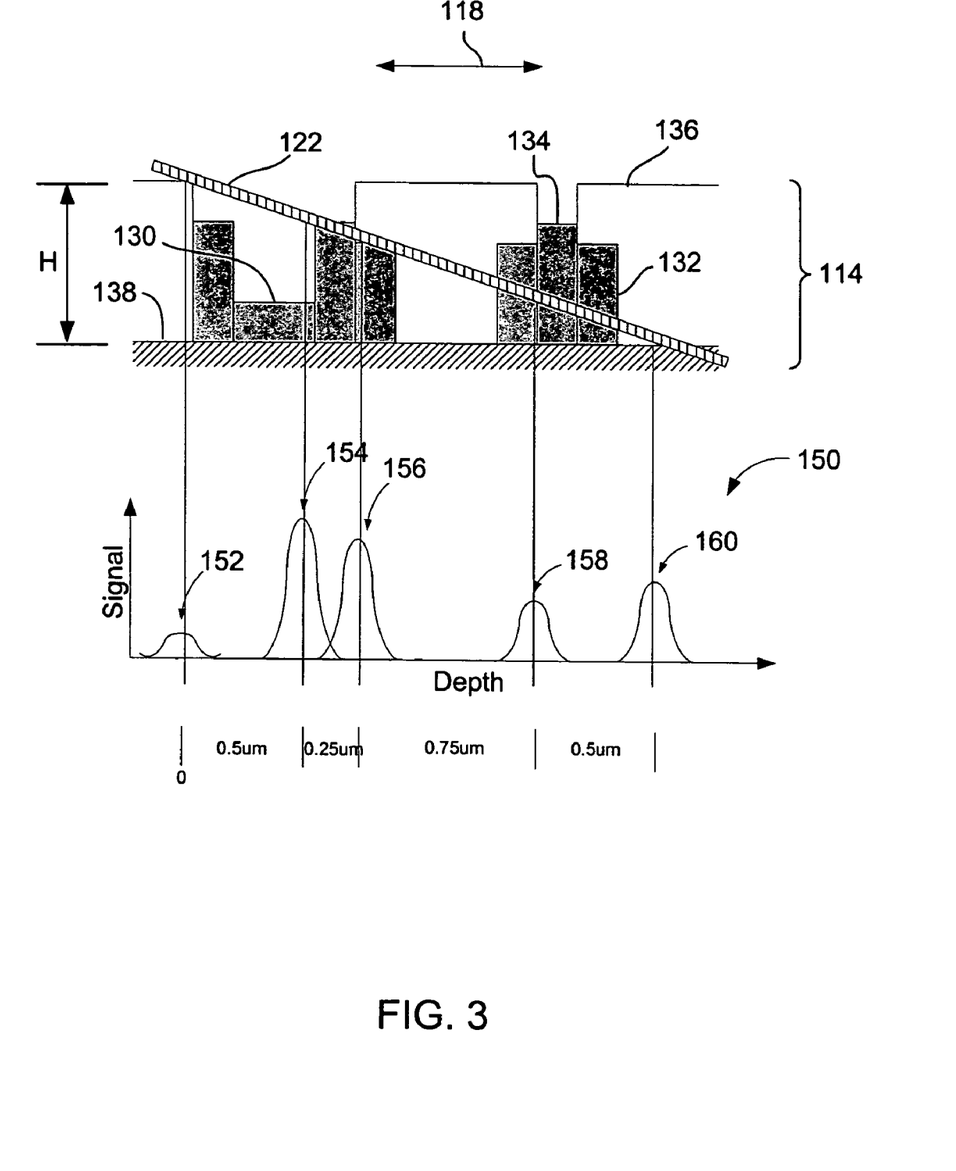
FIG. 3 illustrates a side plan cross-sectional view of a portion of the specimen as indicated in FIG. 1.

FIGS. 2 and 3 illustrate the orientation of confocal sensing location 122 within specimen 114 in further detail. FIG. 2 illustrates a top plan diagrammatic view of an inspection FOV 120 and confocal sensing location 122 that are scanned across specimen 114. As seen in FIG. 2, confocal sensing location 122 is parallel with scanning axis 118 of the optical inspection system. Specimen 114 is a disk shaped semiconductor wafer having a multiple material layers formed on top of a semiconductor substrate. Inspection FOV 120 is the field of view of the optical inspection system from where inspection signals are collected from specimen 114. For example, inspection FOV 120 can be a time delay integration (TDI) field of view.

FIG. 3 illustrates a side plan cross-sectional view of a portion of specimen 114 as indicated in FIG. 1. Specimen 114 has various metal layers 130, 132, and 134, and an oxide layer 136 formed on top of semiconductor substrate 138. Height, H, represents the total height of the layers formed on top of semiconductor substrate 138. Again, scanning direction 118 represents the direction in which an inspection system and autofocus system 100 are scanned across the surface of semiconductor 114. As seen in FIG. 3, the top layer of specimen 114 changes along the length of scanning axis 118. For instance, while moving from left to right, the top layer changes from the top oxide layer 136, to the highest metal layer 134, and then to the lowest metal layer 130. Specimen 114 can have various layers with each layer having various heights and thicknesses.

Typically, an inspection system is primarily concerned with detecting defects upon the layers formed on top of semiconductor substrate 138. Therefore, the autofocus system is designed to focus an inspection system upon a top layer of a thin-film stack, which was most recently formed in the manufacturing process. In FIG. 3, the top layer of the thin-film stack is oxide layer 136. Oxide layer 136 typically will be patterned such that selected areas of layer 134 will be exposed through oxide layer 136 in a dual damascene process. The autofocus system can be set to focus directly upon the top thin-film stack layer 136 or the autofocus system can be set to focus at an offset distance from the top of the oxide layer 136. If desired, the autofocus system can also be set to focus upon the surface of metal layer 134.

As can be seen in FIG. 3, confocal sensing location is shown to be a focal slit 122 that allows autofocus system 100 to focus along a line that passes diagonally along the entire height, H, of the layers formed on top of specimen 114. Focal slit 122 represents the locations at which autofocus system 100 focuses upon. Since focal slit 122 spans the entire height, H, autofocus system 100 is able to accurately determine the height of each layer within specimen 114 since focal slit 122 is able to sense all depths of specimen 114 as specimen 114 is scanned past autofocus system 100 and the inspection system. In other words, the linear array of confocal sensing locations (pinholes or slit) results in fully sampled layer depth information. Ultimately, the sensitivity of confocal imaging allows autofocus system 100 to locate the top surface within specimen 114 by sensing each of the various layers with specimen 114.

Graph 150, which is beneath the diagram of specimen 114 of FIG. 3, shows the strength of a signal versus the depth of specimen 114. The signals of graph 150 represent the signal obtained from scanning focal slit 122 across a portion of specimen 114. In an alternative embodiment, the x-axis of graph 150 represents the pixel number within a CCD detector 112 or the photodiode location within a detector 112. The signal strength is for example, the strength of the reflection of illumination beam 103 off of a layer with specimen 114. The signal can be collected, for example, using time integration detection techniques. The tilt angle of detector 112 determines the depth at which signals are detected along the confocal sensing location 122. The tilt of detector 112 should be a function of depth of focus of the optical system at specimen 114 as well as the expected range of non-flatness of specimen 114.

As seen in graph 150, each of the five peaks correlates to each layer within specimen 114. Each of those layers being, from top to bottom, oxide layer 136, each of metal layers 134, 132, 130, and substrate 138. Detector 112 is positioned and tilted so that each location along focal slit 122 focuses at a respective height within specimen 114. The location along the x-axis of each signal peak indicates the depth of each layer within specimen 114. As shown along the x-axis of graph 150, the depth between each layer is shown in micrometers (um).

In FIG. 2, a single focal slit 122 is positioned to the right of inspection FOV 120. Focal slit 122 therefore is useful for determining the focal distance to a specific layer of specimen 114 as inspection FOV 120 scans towards the right. Autofocus system 100 can thereby determine the correct focal distance before the inspection FOV 120 reaches an area that has already been inspected by autofocus system 100. A computer system can be used to store the focal distances determined by autofocus system 100 for reference when the inspection system eventually reaches a location previously inspected by autofocus system 100.

The position of focal slit 122 can be at various locations along the leading edge 128 of inspection FOV 120. The height of the top most layer of specimen 114 along the axis of focal slit 122 is an appropriate estimate of the height of the top most layer along the entire length of leading edge 128 of inspection FOV 120. However, in some embodiments of the present invention, multiple autofocus systems can be used to more accurately focus upon the top layer of specimen 114. For example, multiple autofocus systems 100 and therefore multiple confocal sensing locations can be aligned in front of inspection FOV 120. In some embodiments, two or three confocal sensing locations with respective detector arrays can be used to better average the autofocus signal relative to the size of inspection FOV 120. Dashed line 124 represents an additional confocal sensing location 124 that can also be used in combination with confocal sensing location 122 to determine the average height of the top layer along the leading edge 128 of inspection FOV 120. The position of each confocal sensing location 122 along inspection FOV 120 can vary. If multiple inspection FOV's 120 are implemented, then multiple confocal sensing locations could also be used for each inspection FOV.

In some embodiments, it will also be useful to have autofocus systems to focus an inspection system as it scans across specimen 114 in the opposite direction. Dashed lines 126 represent confocal sensing locations 126 that can focus an inspection system while inspection FOV 120 scans towards the left.

In some embodiments where wide inspection FOV's 120 are used, tilting of specimen 114 across scanning axis 118 may adversely affect the focus across the leading edge 128 of inspection FOV 120. The tilt of specimen 114 in this case refers to a specimen 114 that is tilted such that the leading edge 128 of inspection FOV 120 is oriented at an inclined angle. To compensate for the varying height of the top layer of a thin-film stack across the leading edge 128 of inspection FOV 120, multiple confocal sensing locations can be used. In this way, an average focal distance to specimen 114 can be determined.

In addition to focusing an inspection system upon whichever layer happens to be the top most layer of a thin-film stack at a specific location along a scan axis, autofocus system 100 also compensates for tilt of a wafer specimen 114 along scanning axis 118. Tilt of a specimen refers to the situation wherein the entire specimen 114 may be tilted such that the surface of specimen 114 changes along scanning axis 118. As seen in FIG. 1, this tilt angle is shown as angle Θ. This is problematic in that the distance between an inspection system and specimen 114 can constantly change as specimen 114 is scanned beneath the inspection system. The varying distance between an inspection system and specimen 114 can cause the inspection system to lose focus upon specimen 114.

Another embodiment involves tilting the specimen 114 perpendicular to the scanning axis 118, if the width of the FOV 120 is large relative to the flatness of the specimen 114 and the depth of focus of the inspection or review system. That is, to maintain best focus over the width of FOV 120 when the specimen 114 it tilted relative to the optical axis to an amount greater than the depth of focus. At least two confocal sensing locations, for example 122 and 124, could be used to generate a slope along the direction 128. This slope information can be sent to a stage 116 that has the capability to tilt the sample 114 such that the top surface of the entire specimen 114 is in focus across the FOV 120.

As mentioned before, confocal sensing location 122 can be a continuous slit or a linear array of pinhole apertures. The linear array of apertures should also be parallel to scanning axis 118. An illumination mask 106 having multiple pinhole apertures is used to form multiple confocal sensing apertures. A similar arrangement should be used for a detector mask or a linear detector. Each pinhole should be located at least 4–5 hole diameters away from each adjacent pinhole to avoid crosstalk between adjacent holes. Pinhole apertures offer improved focus depth discrimination compared with a slit, which only is confocal in only one dimension. However, pinhole apertures are not as light efficient as it is much easier to illuminate a slit compared to an array of discrete pinholes. However, optical fibers can be utilized to provide light efficient pinhole illumination sources. Also, engineered diffractive or binary optical elements can create an array of separate illumination spots from a coherent light source. Preferably, the apertures in illumination mask 106 are approximately the size of or smaller than the diffraction limit of the illumination beam. In this embodiment, each sensor of detector 112 is a point detector that senses the radiation in an area that is approximately the size of or smaller than the diffraction limit of the illumination beam to efficiently gather the focused signal radiation while minimizing detection of stray or unfocused signal radiation. In an alternative embodiment, the point detectors could be located behind a one-dimensional array of pinhole apertures in a plate that form the second part of the confocal image.

In an alternative embodiment, a two-dimensional array of tilted pinholes may be utilized to sense the focus over a much larger field size using the same techniques as described above using a two-dimensional array of sensors.

Figure 4:
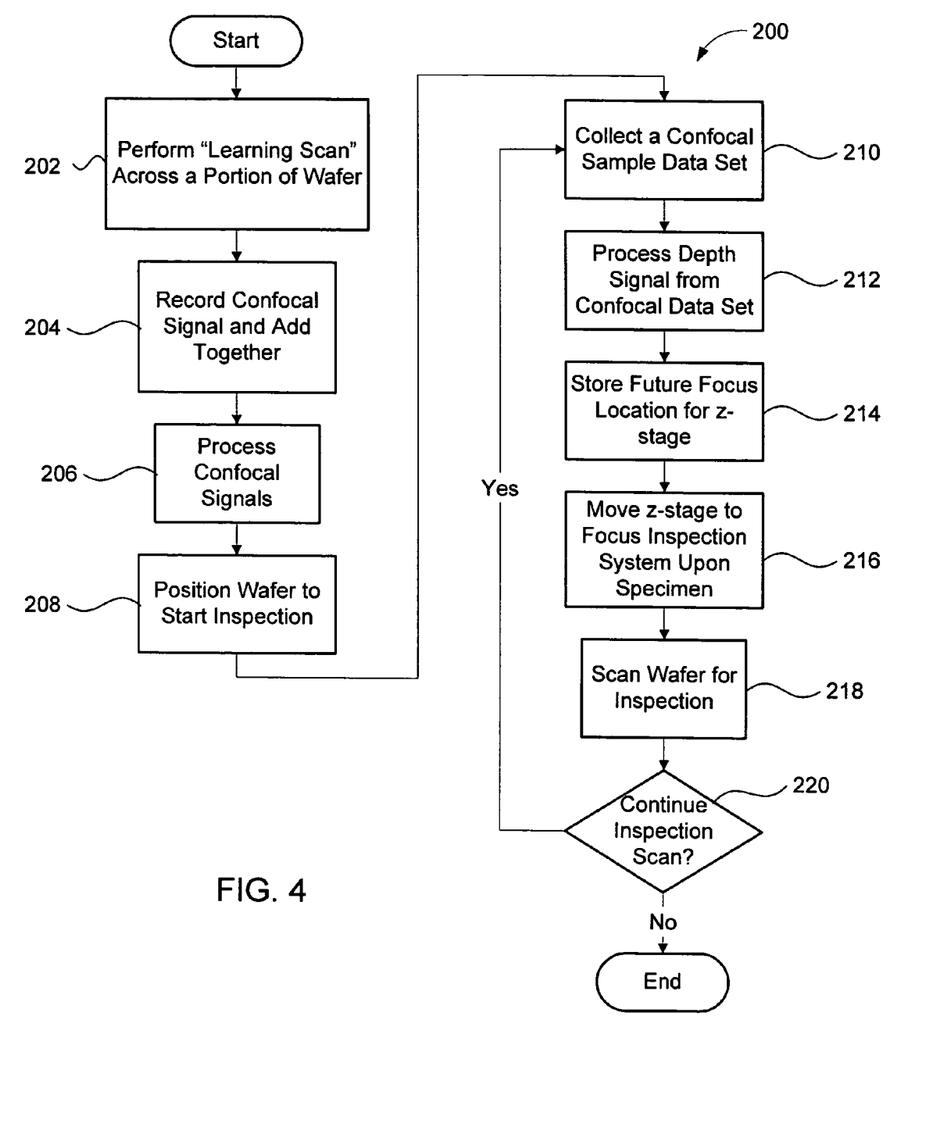
FIG. 4 illustrates a flow diagram that describes an autofocus process according to one implementation of the present invention.
Figure 5:
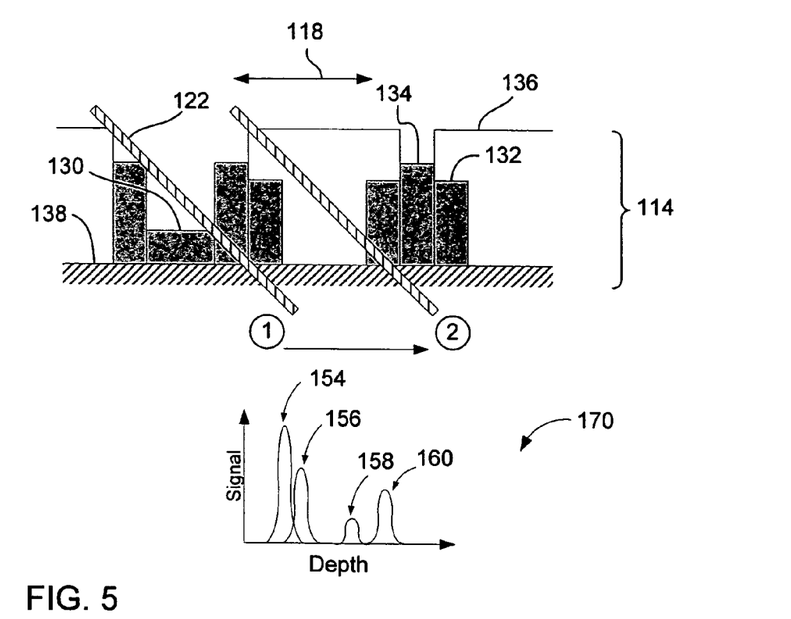
FIG. 5 illustrates a cross-sectional view of the specimen of FIG. 3 during the autofocus process as described by the flow diagram of FIG. 4.
Figure 6A:
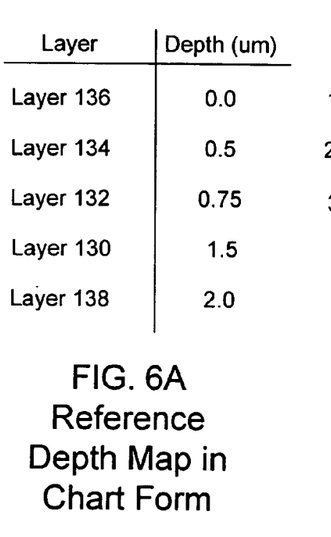
FIGS. 6A and 6B are charts that show depth data relating to each layer within the specimen when taken at different stages of the autofocus process.
Figure 6B:
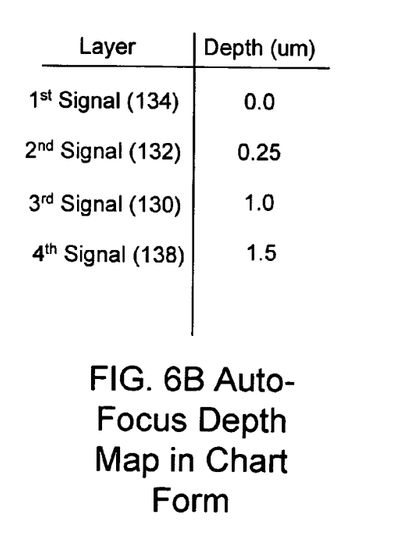

The description will now move to a process for focusing an inspection system upon a specific layer of a specimen using the confocal autofocus system of the present invention. The autofocus process will be described through FIGS. 3, 4, 5, 6A, 6B. FIG. 4 illustrates a flow diagram that describes an autofocus process 200 according to one implementation of the present invention. The autofocus process will be described with reference to specimen 114 as shown in FIG. 3. FIG. 5 illustrates a cross-sectional view of specimen 114 of FIG. 3 during the autofocus process as described by flow diagram 200 of FIG. 4. FIGS. 6A and 6B are charts that show depth data relating to each layer within specimen 114 when taken at different stages of the autofocus process.

Autofocus process 200 is designed to maintain the focus of an inspection system upon a specific layer of specimen 114 as the inspection system is scanned across specimen 114 along scanning axis 118. Commonly, that specific layer will be the top most exposed layer of specimen 114 representing the most recent process step of the wafer fabrication process. Typically, the top most exposed layer is layer 136. Process 200 begins with block 202 where a "learning scan" of autofocus system 100 is performed. A learning scan involves scanning a representative portion of specimen 114 beneath autofocus system 100. The representative portion of specimen 114 allows autofocus system 100 to accurately determine the height of some of every layer within specimen 114. The representative portion of specimen 114 is typically representative of the heights within substantially all of specimen 114 since a semiconductor wafer typically is formed with repeating and identical integrated circuit device areas.

In block 204, the signals that are recorded over the integration time at each height level of specimen 114 are summed together. In other words, as specimen 114 scans past detector 112 the signals are summed over the integration time for detector 112.

In block 206, the detected confocal signals are averaged in order to determine the average height of each layer. Also, the difference in depth between each of the layers within specimen 114 is determined.

At each height level or CCD pixel position (location along 122), the signal would be some variation of the plot shown in graph 150 of FIG. 3 depending upon the amount of each layer present during the integration time. For instance, each signal peak within graph 150 represents the height level (or CCD pixel position) of one of the layers of specimen 114. Peak 152 represents the signal received from the top most oxide layer 136. The strength of the signal from peak 152 is the smallest since oxide layers typically reflect a smaller amount of light than the under lying metal layers. Signal peaks 154, 156, 158, and 160, represent the heights of metal layers 134, 132, and 130, and substrate 138, respectively. Signals that are farther to the right on the horizontal axis indicate layers having smaller height levels (or larger depths relative to the top layer). As can be seen, signal peak 160 represents the height level of substrate 138. Signal peak 160 is on the far right of graph 150 since it has the smallest height (the largest depth). Since confocal sensing locations span the entire height, H, of layers formed over substrate 138, the heights of every layer can be determined. Since the purpose of "learning scan" is to determine the height of each layer present within specimen 114, the focus of the inspection system itself is not critical at this time.

FIG. 6A is a chart that represents the depth of each layer within specimen 114 of FIG. 3 and correlates to graph 150. Oxide layer 136 has a depth of zero. The depth information within the chart of FIG. 6A can be thought of as forming a depth map of specimen 114 that indicates the depth of each layer. The depth map of FIG. 6A is considered a reference depth map since it shows the depth of all layers within specimen 114 and will be referenced later (in block 212) in order to determine the top most layer of a thin-film stack at any point along the surface of specimen 114 during operation.

In some embodiments the operations of blocks 202, 204, and 206 operate to create a reference map that shows the depth of all of the layers within specimen 114. In other embodiments, the reference map indicates the depths of only some of the upper layers within specimen 114. For instance, the reference map may indicate the depths of the top three, four, or however many layers of specimen 114 as is expected to be required for the autofocus data processing operations of the present invention.

In block 208, the learning scan is complete and the actual inspection of specimen 114 is ready to begin. At this time, reference data map is ready for use by autofocus system 100 in order to find the depth of the layer of interest to be focused upon. To begin inspection, specimen 114 is positioned underneath an inspection system and then specimen 114 is scanned by an inspection system and autofocus system 100. During the scanning process, autofocus system 100 is directed at a location in front of the inspection FOV 120 in order to determine the focus information before the inspection field of view reaches a next area to be inspected. As described in FIG. 2, confocal sensing location 122 leads inspection FOV 120 as inspection system and autofocus inspection system 100 scan from left to right across specimen 114.

Block 210 represents the operations of collecting signals gathered from confocal sensing location 122 of autofocus system 100. Sets of signals are collected during successive time intervals to determine the depth of a layer of interest within desired increments along the surface of specimen

114. The length of the time interval partially determines the accuracy of the autofocus system 100. For instance, scanning optics of an inspection system can move across a semiconductor wafer at 100 mm/s. Autofocus system 100 can be set to collect a set of confocal signals every 1/10,000 of a second (10 kHz) so that the inspection system can be focused at every 0.01 mm (10 um) along the length of an inspection-scanning swath.

FIG. 5 illustrates specimen 114 of FIG. 3 during one interval of confocal signal collection and graph 170, which represents the respectively collected confocal signals. In the described interval, confocal sensing location scans from position 1 to 2 (see circled numerals 1 and 2 in FIG. 5). During this scanning interval, signals from layers 130, 134, 132, and 138, are detected and are represented in graph 170. These layers are all of the layers of specimen 114 except for oxide layer 136 since oxide layer 136 is not present in the scanned region of specimen 114 in this example. Signals for each of the detect layers are represented in peaks 154, 156, 158, and 160, which are substantially the same peaks from graph 150 of FIG. 3 for the same material layers. The depth data is also represented in the chart of FIG. 6B. FIG. 6B shows the depth data collected during one interval of the confocal signal collection process represented in FIG. 5 in chart form. Note that during the confocal signal collection process, it is not known which signals correlate to which layer of specimen 114. The chart therefore lists the depth of the detected layers from the shallowest level to progressively deeper layers. The actual layer represented by each depth data point is represented within parenthesis and is only determined after the data processing of block 212 takes place. The first sensed layer is given a relative depth of zero and the subsequently layers are given a depth dimension that is relative to the first sensed layer.

Block 212 represents operations for processing the depth data collected in block 210. The depth data is processed in order to find the height of a specific layer of interest so that an inspection system can properly focus and inspect this layer with a maximum signal. The specific layer is usually the top layer of a thin-film stack, which represents the last processing step during the wafer fabrication process. In FIG. 5, the top layer of the thin-film stack is layer 136. As is commonly understood, the top most layer of a thin-film stack can vary along any one axis due to its supporting structure altering the shape or the wafer itself not being exactly flat due to previous processing steps. Therefore, autofocus system 100 can determine the appropriate adjustments needed to place a specimen at the correct focal distance from an inspection system. In some situations, the inspection system can be purposely focused upon a lower and underlying layer. This could be desirable when the underlying layer is covered by a transparent material layer through which an inspection system can collect data.

In some situations, the focus of an inspection system may need to be adjusted to compensate for the amount that a specimen 114 may be tilted within an inspection system. The tilt of a specimen 114 can result from variances in semiconductor wafer thicknesses, positioning errors of a wafer upon a support stage 116, non-flatness of the supporting stage 116, and other common causes.

The techniques of the present invention for determining the depth of a layer of interest are based upon the reference depth map obtained in block 206. Again, the reference depth map provides depth information regarding all of the layers in specimen 114 due to the configuration of the confocal sensing locations 122. One technique for determining the depth of a specific layer is to interpret the data collected during block 210 as an autofocus height map. This involves determining the height difference between each of the layers for which signals are collected. A comparison of the reference height map against the autofocus height map allows a person or a computer system to match signals from the autofocus height map with signals of the reference height map. Matching signals can be found by considering the relative height differences between layers of a specimen. It should be understood that the difference in heights between each of the layers of specimen 114 should remain substantially the same across the entire specimen 114. With respect to autofocus depth information of FIG. 6B, it can be determined that the four signals are separated from each other in the same configuration as layers 2–5 of reference data map of FIG. 6A. This means that the first sensed layer of the autofocus depth map corresponds to layer 134. Then the subsequent layers correspond to layer 132, 130, and 138. This also means that layer 134 is the top most layer in the area covered by confocal sensing slit 122 as shown in FIG. 5 during its scan from location 1 to location 2. This technique of matching layers with each other can be used to find the depth of any of the layers within specimen 114. Frequently, a specific layer will not be present in a respective autofocus scanning interval. However, depth information from at least two other layers can provide enough data to match the autofocus signals that form autofocus depth map against the reference depth map. Typically, signals from a larger number of layers increase the accuracy of matching the autofocus depth map against the reference depth map.

Then in block 214, the information indicating the depth of a layer of interest is stored in a database for reference when inspection FOV 120 reaches the area analyzed by autofocus system 100. Note that the operation of block 214 is optional and that the inspection system can be immediately adjusted for proper focus without storing depth data within a database.

The intent of the autofocus system is to provide direction to the inspection or review system to maintain focus at a specific layer or offset to a specific layer. In the example illustrated in FIG. 5, the autofocus system will understand that during its scan from location 1 to location 2, that the top surface 136 was not present as it only detected surfaces 134, 132, 130, and 138 by comparing the height differences between layers. It would then insert a new layer for this location in block 214 for surface 136 at 0.5 um above the detected top surface 134 for this particular scan, even though it wasn't detected. This allows the inspection or review system to track the top surface or an offset to the top surface.

The speed of operation of the autofocus system can be tailored to the inspection or review speed and its field of view along the direction of scan. In our example, with a sample rate of 10 kHz and a sample movement of 100 mm/sec, a 10 um long sample of the layer heights was obtained. If the field of view of the inspection system were larger, then it might be appropriate for a slower autofocus speed to match the length of the sample with the speed of inspection and field of view.

In block 218, the inspection system scans the area previously analyzed by autofocus system 100 since the inspection system has been properly focused.

In block 220, a decision is made to whether inspection system needs to scan further along specimen 114 and if the focus of inspection 100 requires adjustment. If the inspection is to continue, then the autofocus process loops back to block 210.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A method for focusing an optical inspection or review system comprising:
generating a reference depth map by determining the depth of at least the three topmost layers within a multilayered thin-film stack;
determining the depth of a layer of interest or a depth that is offset from the layer of interest within the multilayered thin-film stack at a desired location upon the thin-film stack; and
focusing the optical inspection system upon the layer of interest or upon the depth that is offset from the layer of interest.

2. A method as recited in claim 1 wherein generating a reference depth map further comprises determining the depth of substantially all of the layers within the multilayered thin-film stack.

3. A method as recited in claim 1 wherein the operation of generating a reference depth map further comprises:
scanning an autofocus system across the desired location of the thin-film stack;
recording signals received from at least the three topmost layers within the thin-film stack;
determining the average height of at least the three topmost layers of the thin-film stack and the height difference between each of the layers from the recorded signals; and
generating a reference depth map that indicates the relative depths of the at least three topmost layers of the thin-film stack.

4. A method as recited in claim 3 wherein the operation of determining the depth of the layer of interest or the depth that is offset from the layer of interest further comprises:
recording a signal from the layer of interest;
determining the height of the layer of interest at the desired location;
recording a signal from at least one other layer at a location proximate to the desired location;
determining the height of the at least one other layer relative to the height of the layer of interest;
generating an autofocus depth map that indicates the relative depths of the layer of interest and the at least one other layer;
correlating the autofocus depth map to the reference depth map so that each of the layers of the autofocus depth map match up to respective layers of the reference depth map; and
determining the depth of the layer of interest to be equal to the depth of the layer in the reference depth map that correlates to the layer of interest in the autofocus depth map.

5. A method as recited in claim 4 wherein the operation of focusing the optical inspection system upon the layer of interest further comprises:
adjusting the height of the multilayered thin-film stack so that the optical inspection or review system is positioned at the correct focal distance from the layer of interest.

6. A method as recited in claim 1 further comprising:
inspecting or reviewing the layer of interest with the optical inspection or review system.

7. A method as recited in claim 6 wherein the operations of determining the depth of the layer of interest and the operation of focusing the optical inspection system are repeated for each new portion of the thin-film stack that is to be inspected.

8. A method as recited in claim 1 wherein a confocal autofocus system is used to focus the optical inspection system.

9. A method as recited in claim 8 further comprising:
scanning an autofocus illumination beam along a scanning axis across the surface of the thin-film stack;
directing the autofocus illumination beam through an illumination mask wherein the mask includes an array of apertures or a continuous slit such that an array of focal points or a focal slit, respectively, is created within the thin-film stack and is parallel to the scanning axis.

10. A method as recited in claim 9 further comprising:
positioning the illumination mask at an illumination angle with respect to the axis of the autofocus illumination beam such that the focal points or the focal slit is set at a corresponding angle within the thin-film stack and the array of focal points or the focal slit spans an entire height dimension of the thin-film stack.

11. A method as recited in claim 10 further comprising:
positioning a detector mask before a detector wherein the detector mask includes an array of apertures or a continuous slit, wherein the detector mask is positioned at an angle with respect to an optical axis of the inspection system that is conjugate to the illumination angle.

12. A method as recited in claim 10 further comprising:
detecting signals from the thin-film stack with a linear CCD or a linear photodiode array, wherein the linear CCD or linear photodiode array is positioned at an angle with respect to an optical axis of the inspection system that is substantially equal to the illumination angle.

13. A confocal autofocus system comprising:
an autofocus illumination source that generates a illumination beam; and
an illumination mask positioned in front of the illumination source wherein the illumination mask has a single linear array of apertures or a continuous slit, wherein the illumination energy beam passes through the illumination mask and forms a corresponding linear array of focal points or a focal slit within a specimen that is parallel to a scanning direction of the autofocus system, whereby depth data for at least a portion of a height dimension of an area of interest within a thin-film stack can be determined.

14. A confocal autofocus inspection system as recited in claim 13 wherein the illumination mask is positioned at an illumination angle with respect to the axis of the autofocus illumination beam such that the focal points or the focal slit is set at a corresponding angle within the thin-film stack and the array of focal points or the focal slit spans the entire height dimension of the area of interest of the thin-film stack.

15. A confocal autofocus inspection system as recited in claim 14 wherein the thin-film stack includes multiple material layers formed on top of a semiconductor substrate.

16. A confocal autofocus inspection system as recited in claim 14 wherein the thin-film stack includes a single layer or multiple layers formed on top of a glass or transparent substrate, which is part of a lithography mask.

17. A confocal autofocus inspection system as recited in claim 14 further comprising:
a detector mask that is positioned before a detector wherein the detector mask includes an array of apertures or a continuous slit, wherein the detector mask is positioned at an angle with respect to an optical axis of the confocal autofocus inspection system that is conjugate to the illumination angle.

18. A confocal autofocus inspection system as recited in claim 14 further comprising:
a linear CCD or a linear photodiode array for detecting signals from the thin-film stack wherein the linear CCD or linear photodiode array is positioned at an angle with respect to an optical axis of the inspection system that is conjugate to the illumination angle.

* * * * *

UNITED STATES PATENT AND TRADEMARK OFFICE
CERTIFICATE OF CORRECTION

PATENT NO. : 7,142,315 B1 Page 1 of 1
APPLICATION NO. : 10/793026
DATED : November 28, 2006
INVENTOR(S) : Lange et al.

It is certified that error appears in the above-identified patent and that said Letters Patent is hereby corrected as shown below:

Column 1, line 58, change "stools" to --tools--.

Column 6, line 58, change "semiconductor" to --specimen--.

Column 7, line 27, change "with" to --within--.

Column 7, line 36, change "with" to --within--.

Signed and Sealed this

Third Day of July, 2007

JON W. DUDAS
*Director of the United States Patent and Trademark Office*